United States Patent [19]
Darmancier et al.

[11] Patent Number: 6,093,373
[45] Date of Patent: *Jul. 25, 2000

[54] PLATE FOR DISTRIBUTING A MULTIPHASE MIXTURE THROUGH A CATALYTIC BED

[75] Inventors: Denis Darmancier, Vienne; Isabelle Harter, Lyons; Charles Cameron, Paris, all of France

[73] Assignee: Institut Francais du Petrole, Cedex, France

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/805,642

[22] Filed: Feb. 27, 1997

[30] Foreign Application Priority Data

Feb. 27, 1996 [FR] France ................................. 96 02532

[51] Int. Cl.[7] ........................................................ B01J 8/02
[52] U.S. Cl. ............................ 422/220; 422/191; 422/195; 422/224; 261/97; 261/113
[58] Field of Search ..................................... 422/195, 196, 422/270, 310, 311, 220, 191, 224, 211; 261/97, 113

[56] References Cited

U.S. PATENT DOCUMENTS

| | | | |
|---|---|---|---|
| 4,126,540 | 11/1978 | Grosboll et al. | 422/220 |
| 4,140,625 | 2/1979 | Jensen | 208/146 |
| 4,836,989 | 6/1989 | Aly et al. | 422/195 |
| 5,882,610 | 3/1999 | Darmancier et al. | 422/220 |

FOREIGN PATENT DOCUMENTS

| | | |
|---|---|---|
| 0562913 | 9/1993 | European Pat. Off. . |
| 9505893 | 3/1995 | WIPO . |
| 9535159 | 12/1995 | WIPO . |

*Primary Examiner*—Hien Tran
*Attorney, Agent, or Firm*—Antonelli, Terry, Stout & Kraus, LLP

[57] ABSTRACT

Device and application thereof for distributing a multiphase mixture having at least one gas phase including, e.g., hydrogen in part and at least one liquid phase, the mixture being in a downward flow through at least one bed of granular solids, the device including, at least one distributor plate located above one of the beds of granular solids at a distance "d", and several mixing channels of the liquid and gas phases of the mixture. Each of the channels has at least one upper passage section and at least one lower passage section allowing communication between the mixture formed in the mixing channels with a bed of granular solids. The mixing channels are provided on at least part of their height with one or more lateral passage sections, the upper passage section allowing the majority of the gas phase of the mixture to pass and the lateral passage sections allowing passage of the liquid phase and/or at least part of the gas phase inside the mixing channels. The density value of the mixing channels is greater than 80 channels per square meter.

15 Claims, 4 Drawing Sheets

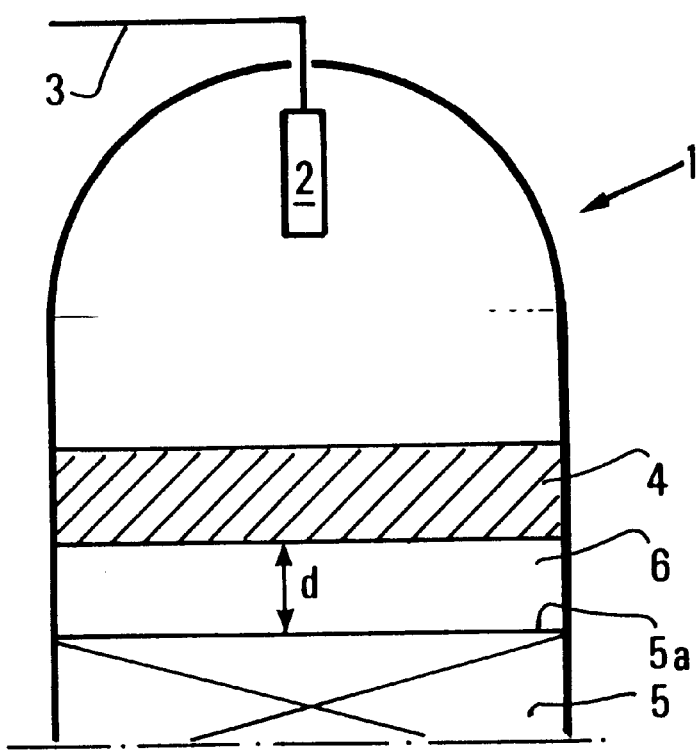
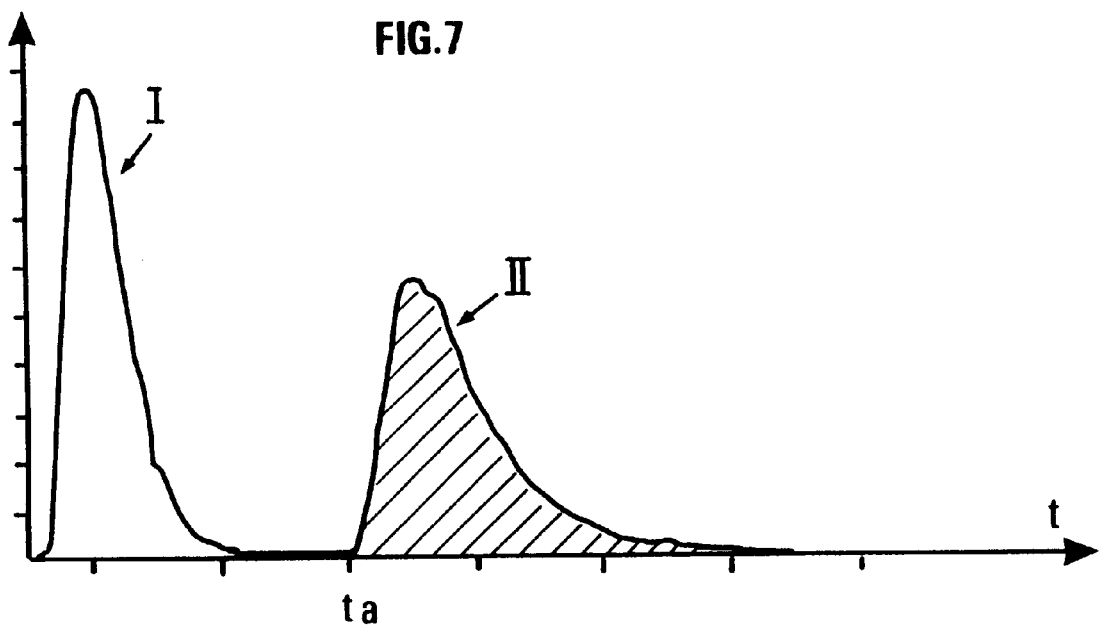

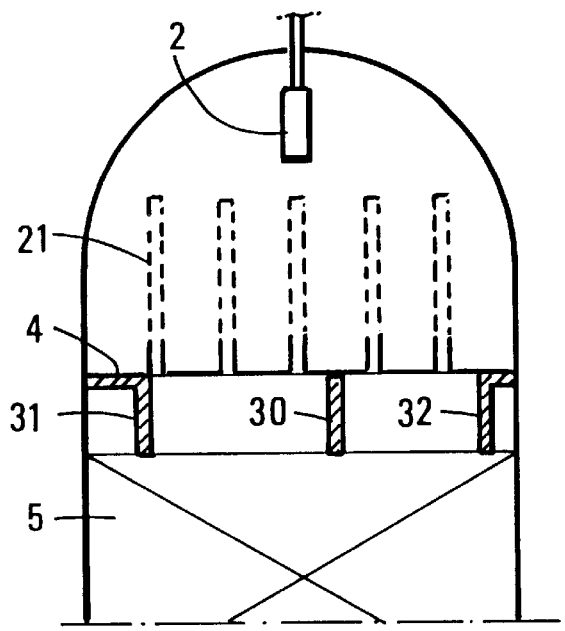 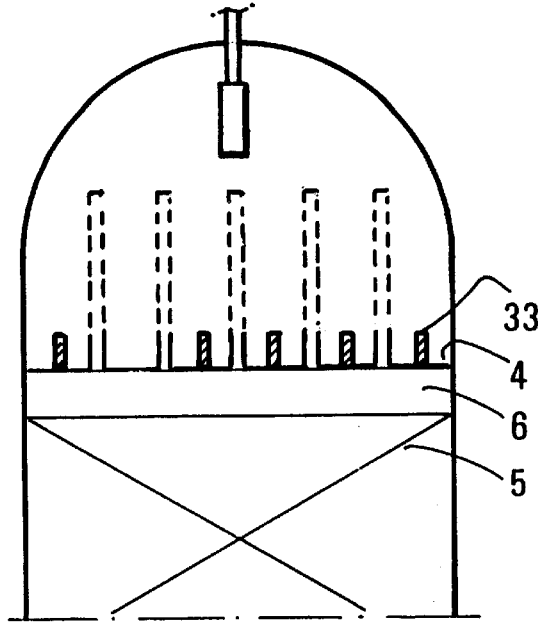
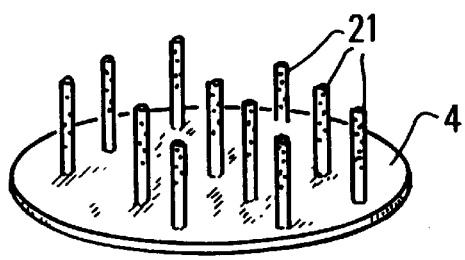
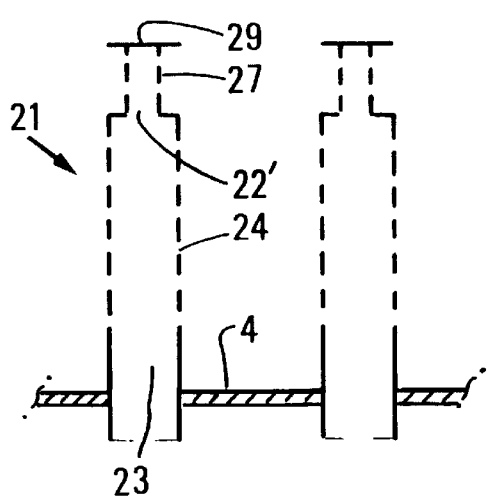 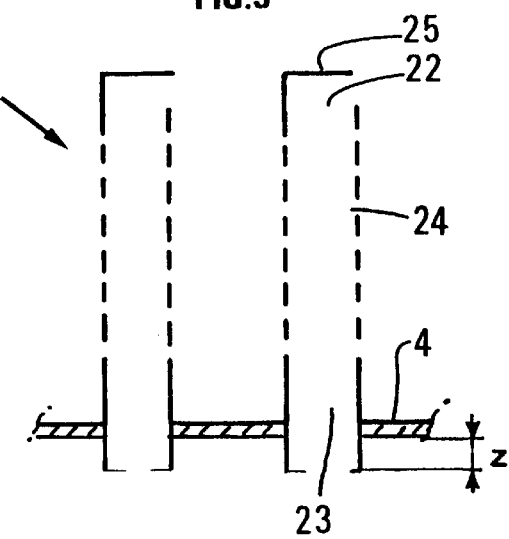

PLATE FOR DISTRIBUTING A MULTIPHASE MIXTURE THROUGH A CATALYTIC BED

BACKGROUND OF THE INVENTION

The present invention relates to a device for optimizing the distribution of a fluid containing for example, at least one gas phase and at least one liquid phase through a bed of granular solids or particles, the fluid being in downward circulation through this bed.

The present invention is particularly applicable to the field of gas/liquid distributors where the gas phase is composed at least partially of hydrogen, for example for selective or total hydrogenations of $C_3$ to $C_5$ cuts, selective hydrogenation of steam-cracked gasolines, hydrogenation of aromatic compounds in aliphatic and/or naphtha cuts, hydrogenation of olefins in aromatic cuts, dearsenification and/or hydrodemetallization of liquid cuts, and hydrodesulfurization, hydrocracking, isomerization, and fixed-bed catalytic reforming reactions.

The invention can also applied to implement other reactions requiring good mixing of a gas phase and a liquid phase, for example partial or total oxidation reactions, aromatic and aliphatic alkylation reactions, and amination, acetyloxidation, ammoxidation, and chlorination reactions.

In this field, one of the key points for achieving good hydrogenation selectivity is proper distribution of the gas and liquid at the head of the reactor or at the head of each catalyst bed in view of the fact that the gas/liquid volumetric ratios generally range from 0.01 to 50 and most frequently from 0.02 to 20.

One possibility used in the prior art consists, for example, as described in the book "Chemical Reactors" by P. Trambouze et al., published by Editions Technip, 1988, on pages 287 and 456, of using distributor plates having a plurality of holes dedicated to passage of the liquid and a plurality of chimneys for passage of the gas. The circulation or passage paths of the liquid and gas phases are different as gas and liquid distribution is in separate phases. The two phases are mixed inside the free space located below the distributor plate. This document recommends using a minimum number of liquid distribution holes to achieve good initial distribution of the phases.

In order to improve distribution of the gas at the head of the catalytic bed and inside the latter, a number of documents describe distributor plates designed to improve distribution of the gas while retaining good distribution of the liquid.

U.S. Pat. No. 4,836,989 refers to various disadvantages resulting from the use of identical passage paths for the liquid phase and the gas phase, which can arise from irregularities in the fluid passage apertures or from the influence of the position of the distributor plate relative to the catalytic bed. To remedy these disadvantages, the technical teaching contained in this document leads an individual skilled in the art to use a specific arrangement of several plates provided with collection and distribution means for the liquid and gas phases separately or in the form of a mixture. A first plate provided with accumulation and passage means for the two phases is associated with means disposed below the plate and allowing these two fluids to spill into a mixing chamber. When they leave this chamber, the two phases are sent separately to the passage orifices of the liquid phase disposed on a second plate and to chimneys each of which has in its upper part an orifice allowing the gas phase to pass. The two phases are thus distributed separately in the space formed by this second plate and a third plate including chimneys provided with passage orifices for the liquid phase and the gas phase and allowing distribution of both phases in the form of a mixture.

Another arrangement that avoids the influence of the level at which the distributor plate is positioned on the distribution of the two phases in the catalytic bed is described for example in U.S. Pat. No. 4,126,540.

The device described in this document has two plates disposed one above the other. The first plate has several orifices allowing the flow of fluid to pass and the second plate has chimneys provided with side orifices and a top orifice. The arrangement of the axes of the orifices for passage of the first plate are offset from the axes of the chimneys such that the liquid is deflected from the top orifices of the chimneys to pass largely through the side orifices. The density of the chimneys on the lower plate is chosen from the values usually recommended by the prior art. This density value is, for example, chosen between 2 and 64 chimneys per square meter, each of these chimneys being provided with a number of passage holes or orifices that is between 1 and 20. The surface area of each of the passage orifices can vary between 0.3 and 19 $cm^2$. The chimney diameter is such that its central aperture ranges from 18 to 645 $cm^2$. This document also teaches positioning the distributor plate relative to the catalytic bed at a distance of at least 7.62 cm and at most 91 cm from this bed.

With such an arrangement, it has been shown that a similar liquid flow is obtained in each chimney. Hence, the device described in this patent avoids substantially different liquid flows in the chimneys, even when the horizontality of the plate is imperfect. This document does not show that the device as described affords better homogeneity for the flow characteristics in the catalytic bed.

Thus it is known to the individual skilled in the art that, by using the usual chimney density values mentioned in the prior art, optimum mixture distribution homogeneity can be obtained.

None of these documents, thus, refers to the possibility of reliably using a distributor plate comprising several chimneys in a simple configuration, for example the plate being used alone, to obtain a good distribution of these phases at the head of the catalytic bed and within the latter.

SUMMARY OF THE INVENTION

It has now been discovered that it is possible to achieve better homogeneity of the flow characteristics relative to the prior art by sharply increasing the density value of the chimneys with which the distributor plate located above the catalytic bed is equipped.

In the device according to the invention, the number of mixing channels is chosen in particular to improve the mixing of the various phases of which a mixture is composed, and thus obtain a resulting better mixing contact with the catalytic bed, as well as better homogeneity of the flow characteristics of the two-phase or multiphase mixture. The mixture may have two or more phases, for example a gas phase and a liquid phase, the structure of this mixture can have various patterns, for example the gas phase can be in the form of fine bubbles dispersed in the liquid phase, or larger pockets of gas. The function of the mixing channels is to allow homogenization of this flow structure.

Advantageously, by choosing the distance between the bed of granular solids and the distributor plate, its distribution can be improved still further, avoiding in particular separation or subdivision of the mixture formed inside the chimneys when it passes through the space separating the distributor plate from the catalytic bed.

The present invention relates to a device for distributing a mixture having at least one gas phase and at least one liquid phase, said mixture being in a downward flow through a bed of granular solids. The device has, for example, at least one distributor plate located above said bed of granular solids at a distance "d"; and several mixing channels of the liquid and gas phases. Each of the channels has at least one passage section in its upper part and at least one passage section in its lower part allowing communication of the mixture formed in the channels with the bed of granular solids. The channels being provided on at least part of their height with one or more lateral passage sections, the passage section of the upper part allows the majority of the gas phase of the mixture to pass and the lateral passage sections allow passage of the liquid phase and/or at least part of the gas phase remaining inside the mixing channels.

The device is characterized in that the density of the mixing channels is greater than 80 per square meter and preferably greater than 90 per square meter. Thus, the mixing zones of the two phases and the distribution point of the mixture thus formed are multiplied.

The density of the mixing channels attached to the plate is preferably between 100 and 700 chimneys per square meter and preferably in the range of 150 to 500.

The mixing channels are, for example, equipped with a means allowing the various liquid and gas phases of the two-phase or multiphase mixture to be guided such as to deflect the flow of the liquid phase of the upper passage section and for the majority of the gas phase to pass through this passage section.

A mixing channel has, for example, a diameter in the range (0.3–8 cm) and preferably for example in the range (0.3–5 cm).

For one mixing channel, the total surface area of the lateral passage sections is at least equal to the surface area of the lower passage section of the mixing channel. The lateral passages may be in the form of slots and/or orifices.

The plate can also have orifices for draining the liquid phase. In this case, the total surface area resulting from the sum of the passage surfaces of each of the drainage orifices is such that the flowrate of the liquid phase through the drainage orifices is less than 10% of the fraction of the liquid phase during operation and preferably less than 5%.

Advantageously, the distance "d" separating the distributor plate from the upper part of the catalytic bed is chosen to preserve the mixture formed inside said mixing channels and coming from the latter until it comes in contact with the catalytic bed. This prevents separation of the liquid and gas phases of the mixture coming from the mixing channels. This value is for example between 0 and 10 cm, preferably between 0 and 5 cm, and still more preferably between 0 and 2 cm.

The mixing channels are for example extended below the distributor plate of a length "z" whose value is less than or equal to "d"/2.

The device according to the invention is, advantageously, particularly applicable to the distribution of a two-phase or multiphase mixture containing at least one gas phase that includes hydrogen.

Thus the device is particularly applicable to distribution of a mixture, for example for selective or total hydrogenation of $C_3$ to $C_5$ cuts, selective hydrogenation of steam-cracked gasolines, hydrogenation of aromatic compounds in aliphatic and/or naphtha cuts, hydrogenation of olefins in aromatic cuts, dearsenification and/or hydrodemetallization of liquid cuts, and hydrodesulfurization, hydrocracking, isomerization, and fixed-bed catalytic reforming reactions.

The device offers, in particular, the following advantages over the devices described in the prior art:

By selecting the number of mixing channels as described in the present invention, for example the chimneys of the distributor plate, mixing is improved and thus the homogeneization of contact of each of the phases, liquid and gas, with the bed of granular solids or catalytic bed is improved.

By selecting the distance between the distributor plate and the bed of granular solids, separation or fragmentation of the mixture formed inside the channels before it contacts the catalytic bed is avoided.

Since the plate is of the self-supporting type, it is easily installed while preserving an appropriate distance; such a design also allows the obstacles encountered by the fluid to be minimized.

The self-supporting structure also allows the distance between the distributor plate and the catalytic bed to be more easily adapted.

BRIEF DESCRIPTION OF THE DRAWINGS

Other advantages and characteristics of the invention will emerge from the description provided hereinbelow of embodiments within the context of applications that are not limited to selective dehydrogenization, with reference to the attached drawings wherein:

FIG. 1 shows schematically a reactor with a distributor plate;

FIG. 2 shows schematically a distributor plate provided with several chimneys;

FIGS. 3 and 4 show examples of the geometries of the chimneys with which the distributor plates are equipped;

FIGS. 6A and 6B represent two embodiments of the device according to the invention in which the distance between the distributor plate and the catalytic bed respects a given value;

FIG. 7 shows a curve representing the distribution of the residence time of a fluid in the catalytic bed;

DETAILED DESCRIPTION OF THE PREFERRED EMBODIMENTS

Figure 5A:
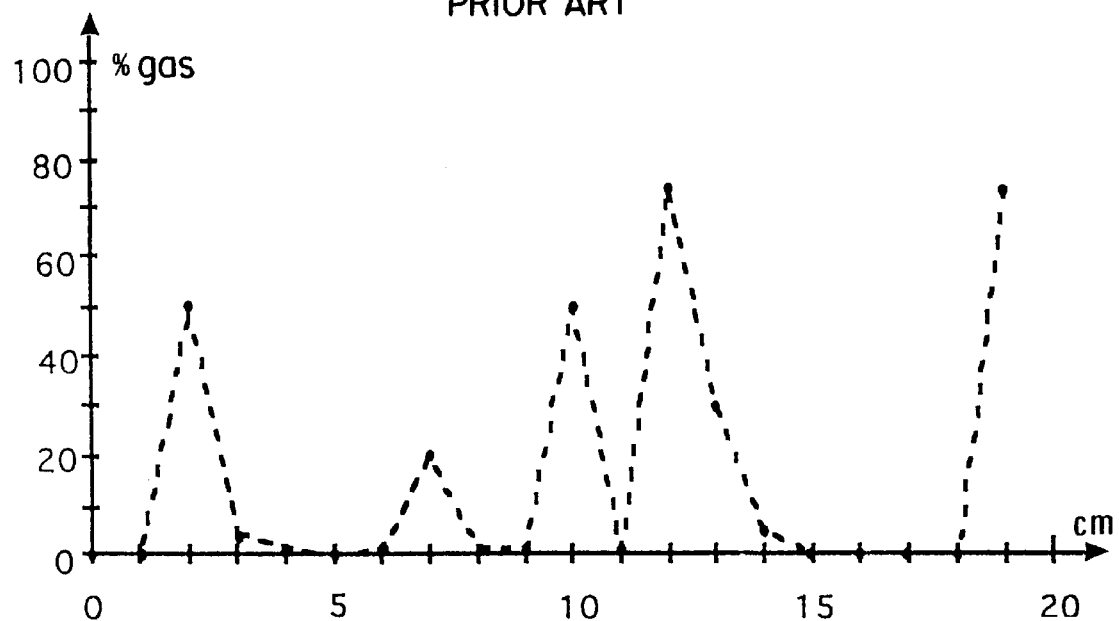
FIGS. 5A and 5B represent respectively the distribution of the gas phase in the catalytic bed obtained, using a device according to the prior art and according to the present invention.

For better understanding of the invention, the description provided hereinbelow as a nonlimiting example relates to a distribution system used in a reactor designed for selective hydrogenization of unsaturated compounds contained in the $C_3$ to $C_5$ cuts of a fluid including hydrocarbons. However, the device according to the invention can also be used in all the reactions listed at the beginning of the description.

This system may, without departing from the framework of the invention, be used in any device and any field where it is desirable to achieve good distribution of a two-phase or multiphase fluid, namely a fluid with several phases with different densities. The phases may be gas, liquid, and/or solid.

FIG. 1 shows schematically a distribution system used for example in a column such as a reactor designed for selective hydrogenization of the unsaturated compounds contained in the $C_3$ to $C_5$ cuts of a fluid containing hydrocarbons.

The reactor shown schematically in FIG. 1 has for example an enclosure 1 whose upper part or reactor head contains an inlet predistributor 2. The mixture, for example made of hydrogen and a fluid containing hydrocarbons, is formed upstream of the reactor and injected by a pipe 3 communicating with inlet predistributor 2. The mixture distributed by inlet predistributor 2 flows down to distributor plate 4 which is located above and at a distance "d" from a first bed of granular solids 5 or catalytic bed. The head of catalytic bed 5A as well as distributor plate 4 delimits, with the walls of the reactor, an empty space 6 whose height may be made to vary for example to improve contact between the mixture coming from the chimneys and the head of the catalytic bed as described hereinbelow.

Distributor plate 4 having several mixing channels will be described in greater detail in FIGS. 2, 3, and 4. One of the essential characteristics of this plate is to have a mixing channel density chosen to improve the mixing of the various phases of flowing fluid. Two examples of geometries for these mixing channels are provided below in FIGS. 3 and 4 in an indicative and nonlimiting manner.

A distributor plate 4 (FIGS. 2, 3, and 4) has for example a plurality of mixing channels such as chimneys 21 having at least one upper passage section 22 (FIG. 3), for example an orifice at its upper part, and an lower passage section 23 (FIGS. 3 and 4) in its lower part at the level of the distributor plate. The upper part of the chimney can thus be beveled (FIG. 3). The chimneys are provided, for example at least in part on their side walls, for example in the case of a tubular geometry, with one or more lateral passage sections 24 distributed over at least part of the height of chimney 21. The lateral passage sections can be of different shapes, for example they may be in the form of orifices with different geometries and/or of one or more slots.

Preferably, a minimum height h is provided between the upper face of the distributor plate (the face receiving the liquid phase) and the first lateral passage sections covered by the rise in the liquid phase. This means that the orifices located in the lower part of the chimney or, in the case of a slot, the bottom of the slot, are above height "h."

Advantageously, the number of chimneys 21 is chosen to obtain a density per square meter of over 80, preferably over 90. This value is preferably between 100 and 700 chimneys per square meter, and still more preferably in the range 150 to 500.

For chimneys of cylindrical geometry, the diameters of chimneys 21 are for example in the range of 0.3–8 cm and preferably in the range of 0.3–5 cm.

The height "h" is preferably between 5 mm and 25 cm.

The total lateral passage section resulting from the sum of all the lateral passage sections of the chimneys is preferably equal to at least the area of the lower passage section of the chimney. The hole diameter is equal to a maximum of 75% of the diameter of the corresponding chimney, for example less than 6cm, preferably less than 3.75 cm, but at least equal to or greater than 1 mm.

One means of conferring a certain direction on the liquid and gas phases, such as a baffle 25, is disposed for example at the upper part of chimney 21. Thus, in FIG. 3, baffle 25 avoids a direct flow of the liquid phase through the upper passage section 22 of chimney 21. The size of this baffle is equal to at least the upper passage section of the chimney.

During operation, the two-phase or multiphase mixture distributed by predistributor 2 flows as follows: the gas phase penetrates one of the chimneys through its upper opening 22 while its liquid phase is deflected due to the presence of baffle 25 onto plate 4 where it accumulates. Because of this accumulation, the liquid level rises and gradually covers lateral passage sections 24 with the liquid passing through to penetrate inside chimney 21. The gas phase principally penetrates inside chimney 21 via passage section 22 located at the upper part of the chimney but also through the passage sections 24 not covered with liquid as the phase is above the level of the liquid. The two phases separated by the baffle become mixed inside the chimneys. The mixture thus formed flows through the lower orifice and empty space 6 (FIG. 1) before contacting the head of the catalytic bed.

Advantageously, the channels extend below distributor plate 4 over a distance "z" to prevent the liquid phase of the mixture coming from the channels from flowing along the lower face of the mixing plate. This prevents fractionation of the mixture formed inside the channels before it contacts the catalytic bed. The value of distance "z" is for example less than "d"/2.

The two-phase gas and liquid distribution brought about by the large number of chimneys on the plate creates a regime of bubbles dispersed in the chimneys and thus allows for more homogeneous distribution at the head of and within the catalytic bed.

Distributor 4 advantageously has drainage orifices. These drainage orifices allow the liquid phase to be evacuated when the reactor is turned off. The total surface area of the drainage orifices is chosen so that the flow of liquid phase through the drainage orifices is less than 10% of the fraction of the liquid phase during reactor operation and preferably less than 5%.

FIG. 4 shows another embodiment of a chimney that can be installed on the plate, differing principally from the embodiment of FIG. 3 by the position of the baffle. Chimney 21 shown in FIG. 4 has substantially identical characteristics for lower and upper passage sections 23 and 22' and lateral passage sections 24 identical to those of chimney 21 (FIG. 3). In this embodiment, baffle 29 is connected to chimney 21 by two mounting means 27 such as tabs. The number of tabs and their geometric characteristics are chosen such as not to impede passage of the gas phase inside the chimney.

Passage of the phases is effected in a substantially identical manner to the manner described with respect to FIG. 3. The mixture formed inside the chimneys and emerging therefrom is then made to contact the upper part of the catalytic bed or bed head after passing through empty space 6 (FIG. 1).

The distributor plate according to the invention is particularly well suited for distributing a liquid-gas mixture through a reactor having one or more beds of granular solids or catalysts, and the right mixture leaving the chimneys allows either the selectivity of the desired product (in the case of selective reactions) to be improved or the content of undesired products in the effluent to be improved (by decreasing it for example), for example in dearsenification or total hydrogenization reactions, or the operating cycle to be increased.

Efficiency measurements in such a device for gas-liquid distribution in a section of a catalytic bed have been made by measuring the gas levels locally with an optical fiber. The principle of these measurements is based on the variation in light reflection as a function of the medium in which the end of an optical fiber is immersed so that, for a given length of time, the quantity of gas passing near the optical fiber can be determined. After appropriate statistical processing, the difference in the indices of reflection of the gas and liquid phases is sufficient to distinguish the proportion or percentage of the gas phase relative to the liquid phase at a given point in the reactor section.

Figure 5B:
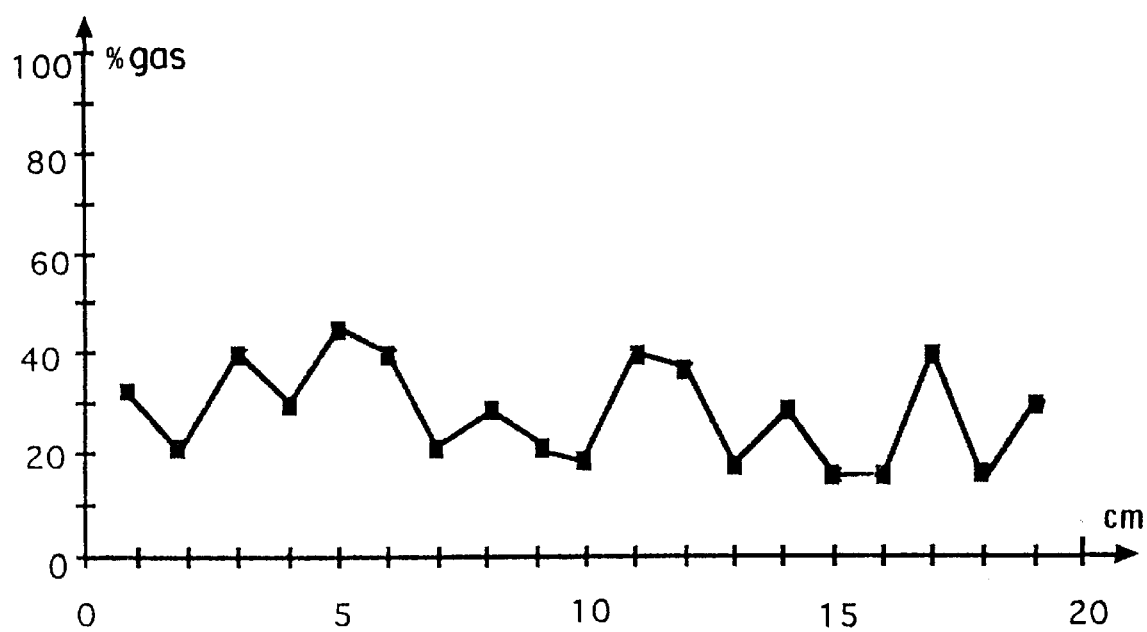

The results shown in the curves of FIGS. 5A and 5B were obtained:

with a two-phase mixture in downward cocurrent flow containing nitrogen and heptane in a volume ratio of 0.5, a column 400 mm in diameter, 4 m high, and operating under pressure conditions of 4 to 10 bars absolute, a catalytic bed composed of granular solids whose grains have sizes ranging from 1.2 to 2.4 mm, and a distance of 10 cm between the distributor plate and the catalytic bed, with distributor plates having the following characteristics:

for the distributor plate according to the prior art corresponding to the results shown in FIG. 5A, a chimney density of approximately 64, with the plate having eight chimneys with an inside diameter of 50 mm, each of the chimneys having twenty 15 mm holes distributed over the height of the chimney in 10 rows, these rows being spaced 25 mm apart. The upper part of each chimney is provided with a baffle 29 with a diameter of approximately 65 mm and the baffle is connected to chimney 26 by two tabs, for example 27 (FIG. 4).

for the distributor plate according to the invention, corresponding to the results of FIG. 5B, a chimney density of substantially 438 per square meter, the plate having 55 chimneys with a diameter of 10 mm and having 20 passage orifices 24 having diameters of 5 mm, which are distributed over the height of the chimney in 10 rows, the rows being approximately 25 mm apart, the baffle diameter being for example approximately 10 mm (FIG. 3).

The measure consisted of introducing the fiber at the level of one reactor section located approximately 40 cm below the bottom of the distributor plate, initially positioning it in the center of the reactor, and displacing it horizontally centimeter by centimeter in order to obtain a series of measurements on one radius of the reactor.

For the two curves shown (FIGS. 5A and 5B), the abscissa axis represents the position of the measuring fiber in the reactor, referenced to the wall of the column, and the ordinate axis represents the percentage of gas relative to liquid.

FIG. 5A obtained from a reactor equipped with a distributor plate according to the prior art shows a gas percentage distribution that varies sharply from one measuring point to another. This variation represents zones for which the presence of gas is practically zero, hence points at which the catalytic bed is practically bathed by a largely liquid phase and not a liquid-gas mixture. It is in the range 0%–80%.

On the other hand, in FIG. 5B that shows the measurements made with a distributor plate having a chimney density according to the present invention a variation in gas percentage within a far smaller range, between 15 and 45%, is observed, expressing better homogeneity of the gas phase distribution in the catalytic bed.

Measurements taken from various points of the reactor, for various catalytic sections, or in the same section but with different radii, show that the gas phase is still present and in contact with the catalytic bed, thus avoiding the presence of the liquid column found in the reactors of the prior art.

The improvement in distribution obtained by a judicious choice of the chimney density value, within one of the aforesaid ranges, can be improved by choosing the distance "d" between the catalytic bed and the distributor plate. Indeed, the distance "d" between the distributor plate and the head of the catalytic bed is a parameter that can influence the mixture obtained in the chimneys, particularly the stability of this mixture, due to the differences in the flowrates of the liquid and gas phases.

To decrease the distance "d," the structure of distributor plate 4 is of the self-supporting type, the plate being associated with a support means comprising for example several beams placed on the plate. Such an arrangement advantageously allows the various fluids to circulate in the space below the plate, minimizing obstacles that could damage preservation of the mixture.

The distance "d" is chosen for example in the range of values 0–10 cm, preferably in the range 0–5 cm, and still more preferably in the range 0–2cm.

FIGS. 6A and 6B show two examples of arrangements for which plate 4, having characteristics as described in FIGS. 2 to 4, is associated with a support system.

The reactor described in FIG. 6A shows a distributor plate 4 according to the invention equipped with three support beams 30, 31, 32 one of which is disposed substantially at the center of the plate along the axis of the reactor while the other two beams are for example located at the outer edges of the distributor plate in the vicinity of the inside walls of enclosure 1.

Beams 30, 31, and 32 have for example the following geometric characteristics:

a height of approximately 10 cm and a thickness of approximately 10 mm in order to hold the distributor plate equipped with chimneys.

FIG. 6B differs from the arrangement shown in FIGS. 6A due to the presence of stiffening elements 33 integrated for example with the distributor plate instead of the support beams.

The stiffeners are provided with holes to prevent the liquid from compartmentalizing on the plate.

The distributor plate used in the following examples has substantially identical characteristics to those of the distributor plate used to obtain the results given in FIG. 5B, particularly a chimney per square meter density of substantially approximately 438.

The effect of the distance between the distributor plate and the head of the catalytic bed is determined by measuring the residence time.

The principle is described in relation to FIG. 7: at time t=0, a tracer, isohexadecane for example, is introduced into the principal fluid, heptane for example. The shape of the signal obtained is recorded and analyzed, measuring the difference in refractive index for example between the principal fluid and the tracer. This signal is considered to be the input signal (I). At a later time t, the shape of signal (II) or output signal is observed. The parameters analyzed are the time ta for the output signal to appear and the area under the signal shape obtained which represents the mean tracer concentration at a given point in time.

Figure 9:
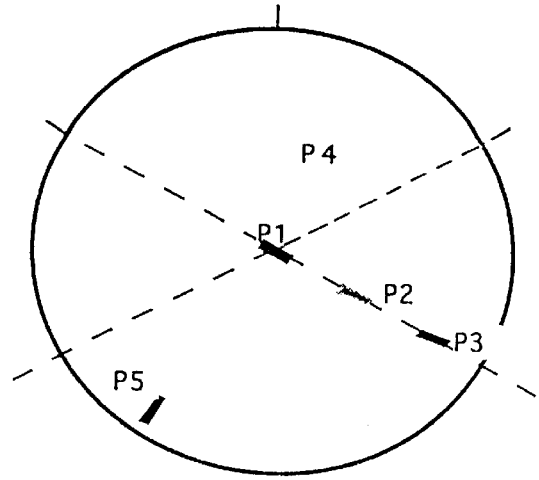
FIG. 9 shows the distribution of measuring points in one section of a catalytic bed.

These measurements are taken at several points of the same section of the catalytic bed, for example at sampling points numbered P1, P2, P3, P4, and P5 in FIG. 9 and, in the two examples that follow, the sampling points are located in one section of the catalytic bed located approximately 40 cm below the bottom of the plate.

Two series of measurements are made for two positions of this distributor plate relative to the catalytic bed and the various curves obtained are plotted. The abscissa axis represents time and the ordinate axis represents tracer fluid concentration.

Figure 8A:
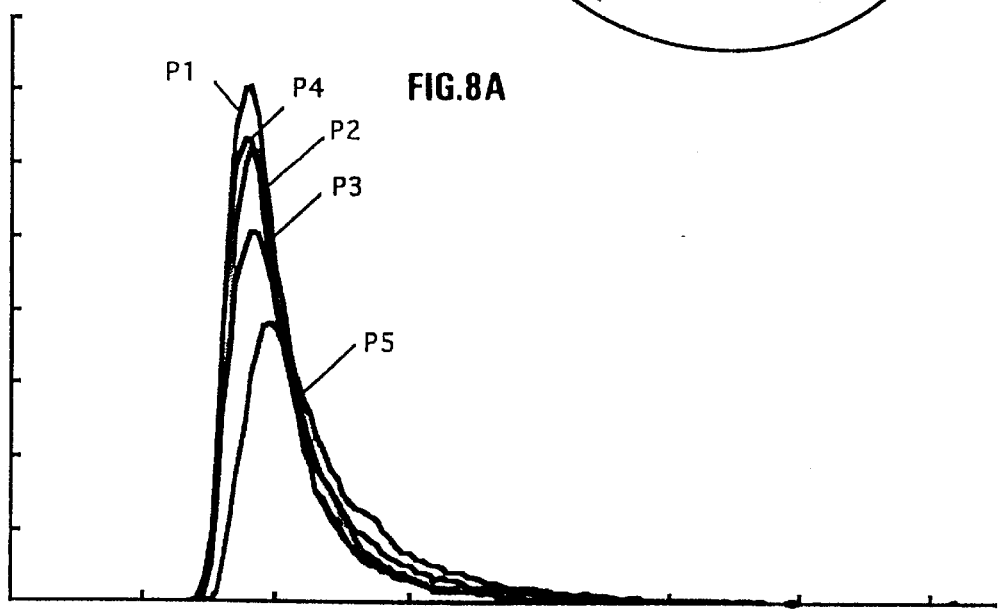
FIGS. 8A and 8B show distribution curves of the mean tracer concentration obtained with the aid of the devices described in FIGS. 6A and 6B, respectively representing the influence of distance.

The 5 curves shown in FIG. 8A are obtained for a distributor plate 4 having a self-supporting design according to the invention (FIG. 6A) and approximately 10 cm from the head of the catalytic bed show some disparity in the value of the areas, particularly the peak heights showing a difference in terms of quantity of liquid from one sampling point to another. Differences in the times for the signals to appear are also noted.

Figure 8B:
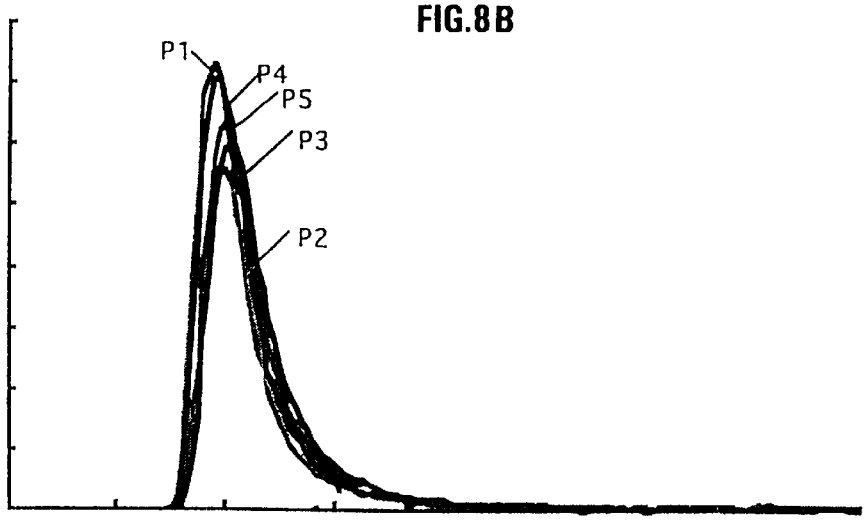

On the other hand, the curves shown in FIG. 8B are obtained for the same sampling points, but for a reactor provided with a self-supporting distributor plate having a design according to the invention (FIG. 6B), allowing the plate to be positioned at a distance of approximately 2 cm from the head of the catalytic bed, are more closely grouped. This grouping expresses a smaller disparity in the tracer concentration value, hence a fluid flow that is closer to the shape of a piston.

These results show that it is preferable to dispose the distributor plate at a distance of 2 cm relative to the catalytic bed rather than at a distance of 10 cm from the catalytic bed.

What is claimed is:

1. A reactor, comprising:

an enclosure;

an inlet provided at an upper part for a two-phase or multiphase mixture having at least one gas phase;

at least one bed of granular solids provided at a lower part of the enclosure; and at least one distributor plate provided between the inlet and the at least one bed of granular solids, the at least one distributor plate having a plurality of mixing channels providing flow passages through the at least one distributor plate, each of the mixing channels having an upper passage section and a lower passage section, and being provided on at least part of their height with one or more lateral passage sections, the upper passage section allowing a majority of the gas phase of the mixture to pass and the lateral passage section allowing passage of the liquid phase into the mixing channels, the density of the mixing channels being at least 300 mixing channels per square meter.

2. Reactor according to claim 1, characterized in that the density of said mixing channels attached to said at least one plate is between 300 and 700 mixing channels per square meter.

3. Reactor according to claim 1, characterized in that said mixing channels are provided with a baffle allowing the liquid and gas phases of said two-phase or multiphase mixture to be guided to prevent direct passage of the liquid phase through the upper passage section of the mixing channel.

4. Reactor according to claim 1, characterized in that for one mixing channel the total surface area of the lateral passage sections (24) corresponding to the sum of the surface areas of all the lateral passage sections is at least equal to the area of the lower passage section (23) of a mixing channel.

5. Reactor according to claim 1, characterized in that said plate is provided with orifices for draining the liquid phase, the total surface area resulting from the sum of the passage surface areas of each of the orifices being such that the flowrate of the liquid phase through the drainage orifices is less than 10% of the fraction of the liquid phase during operation.

6. Reactor according to claim 1, characterized in that the distributor plate is provided a distance "d" above the at least one bed of granular solids so as to preserve the mixture formed inside said mixing channels and leaving said missing channels through said lower passage sections until the point of distribution in the bed.

7. Reactor according to claim 6, characterized in that the value of distance "d" is between 0 and 10 cm.

8. Reactor according to claim 6, characterized in that a mixing channel is extended below the distributor plate for a length "z" and the value of "z" is less than or equal to "d"/2.

9. Reactor according to claim 1, characterized in that the density of said mixing channels attached to said plate is between 300 and 500 mixing channels per square meter.

10. Reactor according to claim 1, characterized in that said mixing channels have a diameter whose value is within the range of 0.3–8 cm.

11. Reactor according to claim 1, characterized in that said mixing channels have a diameter whose value is within the range of 0.3–5 cm.

12. Reactor according to claim 6, characterized in that the value of distance "d" is between 0 and 5 cm.

13. Reactor according to claim 6, characterized in that the value of distance "d" is between 0 and 2 cm.

14. Reactor according to claim 1, characterized in that only a single distributor plate is provided.

15. A process for distributing a two-phase or multiphase mixture having at least one gas phase that includes hydrogen and at least one liquid phase, comprising:

flowing said mixture through a distribution device and then through at least one bed of granular solids, the distribution device comprising:

at least one distributor plate located above one of said beds of granular solids at a distance "d";

several mixing channels of said liquid and gas phases of said mixture, each of said channels having at least one upper passage section and at least one lower passage section allowing communication of the mixture formed in said mixing channels with the bed of granular solids, said mixing channels being provided on at least part of their height with one or more lateral passage sections;

said upper passage section allowing the majority of the gas phase of said mixture to pass and said lateral passage sections allowing passage of the liquid phase inside said mixing channels and/or at least part of the gas phase, characterized in that the density of said mixing channels is at least 300 channels per square meter.

* * * * *